United States Patent
Ren

(10) Patent No.: US 9,250,661 B2
(45) Date of Patent: Feb. 2, 2016

(54) TOUCH SENSOR, TOUCH SCREEN AND DISPLAY DEVICE

(71) Applicant: Beijing BOE Optoelectronics Technology Co., Ltd., Beijing (CN)

(72) Inventor: Tao Ren, Beijing (CN)

(73) Assignee: BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 13/979,947

(22) PCT Filed: Jan. 8, 2013

(86) PCT No.: PCT/CN2013/070193
§ 371 (c)(1),
(2) Date: Jul. 16, 2013

(87) PCT Pub. No.: WO2013/177956
PCT Pub. Date: Dec. 5, 2013

(65) Prior Publication Data
US 2014/0055687 A1    Feb. 27, 2014

(30) Foreign Application Priority Data

May 29, 2012 (CN) .................. 2012 2 0246592 U

(51) Int. Cl.
*G06F 1/16* (2006.01)
*G06F 3/041* (2006.01)

(52) U.S. Cl.
CPC ............... *G06F 1/169* (2013.01); *G06F 3/041* (2013.01)

(58) Field of Classification Search
None
See application file for complete search history.

(56) References Cited

U.S. PATENT DOCUMENTS

| 2011/0234512 | A1  | 9/2011 | Kim |
| 2012/0098762 | A1  | 4/2012 | Kim |
| 2012/0105343 | A1* | 5/2012 | Lee et al. ............... 345/173 |

FOREIGN PATENT DOCUMENTS

| CN | 102200856 A | 9/2011 |
| CN | 102200858 A | 9/2011 |
| CN | 102455820 A | 5/2012 |

(Continued)

OTHER PUBLICATIONS

International Search Report (Chinese language) issued by the International Searching Authority, rendered May 29, 2012, 10 pages.
English abstract of CN102467293(A), 28 pages.

(Continued)

*Primary Examiner* — Kenneth B Lee, Jr.

(57) ABSTRACT

Embodiments of the present invention provide a sensor, a touch screen and a display for decreasing damage possibility of the touch screen. The touch sensor comprises a horizontal conducting layer, a conductive bridge having two ends respectively connected with one horizontal conducting layer, and a vertical conducting layer, the conductive bridge overlapping with the vertical conducting layer and being spaced from the vertical conductive layer by an insulating layer; the vertical conducting layer comprises at least one insulating zone provided at a first designated position; a distance of two corresponding end points in a width direction of the conductive bridge of the projection zone, which projection zone is a normal projection zone of the at least one insulating zone on the conductive bridge, is not less than a width of the conductive bridge.

17 Claims, 4 Drawing Sheets

(56) References Cited

FOREIGN PATENT DOCUMENTS

| | | |
|---|---|---|
| CN | 102467293 A | 5/2012 |
| KR | 20120044500 A | 5/2012 |

OTHER PUBLICATIONS

English abstract of CN102455820(A), 32 pages.
English abstract of CN102200858(A), 9 pages.
English abstract of CN102200856(A), 25 pages.
English abstract of KR20120044500, 2 pages.
International Preliminary Report on Patentability issued by The International Bureau of WIPO on Dec. 2, 2014 for International Application No. PCT/CN2013/070193, 9 pages.
Office Action (Korean language) issued by the Korean International Patent Office ("KIPO") on Dec. 31, 2014 for Application No. 10-2013-7015430, 4 pages.
English translation of Office Action issued by KIPO for Application No. 10-2013-7015430, 2 pages.

* cited by examiner

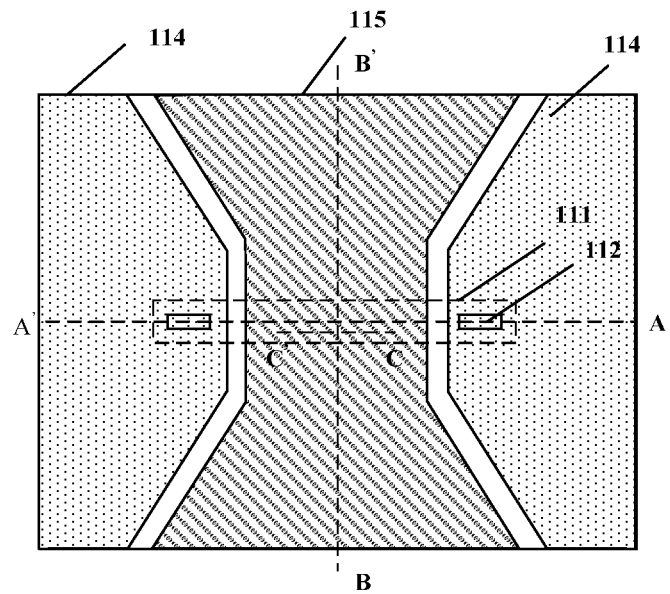
FIG.1 - PRIOR ART
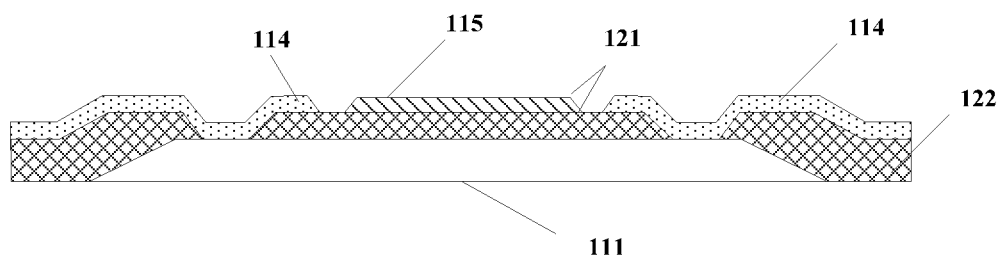
FIG.2 - PRIOR ART
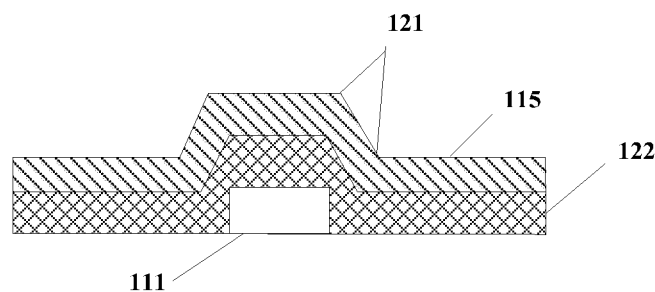
FIG.3 - PRIOR ART

TOUCH SENSOR, TOUCH SCREEN AND DISPLAY DEVICE

CROSS REFERENCE TO RELATED APPLICATIONS

This application is based on International Application No. PCT/CN2013/070193 filed on Jan. 8, 2013, which claims priority to Chinese National Application No. 201220246592.1, filed on May 5, 2012, the contents of which are incorporated herein by reference.

TECHNICAL FIELD

Embodiments of the present invention relate to a touch sensor, a touch screen as well as a display device.

BACKGROUND

With the advancement of science and technology, touch screens have been widely applied to display devices. An existing touch screen comprises touch sensors therein, and for example, FIG. 1 is a top view of one of such touch sensors.

The touch sensor comprises a horizontal metal layer 114, a vertical metal layer 115, and a metal bridge 111 for connecting horizontal metal layers 141 on two sides in the horizontal direction, which are used for transmitting signals when the touch screen is contacted by an object. In the technology for manufacturing the above touch sensor, because an insulating layer 122 is provided between the metal bridge 111 and the horizontal and vertical metal layers 114 and 115, for making the two ends of the metal bridge 111 contact with the horizontal metal layers 114, the insulating layer 122 between the both ends of the metal bridge 111 and the horizontal metal layers 114 has to be etched off to form through holes 112, through which the horizontal metal layers 114 on both sides are conducted via the metal bridge 111. The sectional structure taken along the A'A direction of FIG. 1 is shown in FIG. 2.

The process for manufacturing the above touch sensor is described as follows.

Step A, forming a layer of metal material on a substrate and then etching the same to form a metal bridge 111;

Step B, forming a layer of PVX on the metal bridge, and then etching the same to form an insulating layer with through holes 112; the positions of the through holes 112 are, as shown in FIG. 1, at the ends of the metal bridge 111 from the above;

Step C, forming a layer of indium tin oxides ITO on the insulating layer, and then etching the same to form the vertical metal layer 115 and the horizontal metal layer 114.

The sectional structure along the B'B direction of FIG. 1 is shown in FIG. 3; and since the touch sensor is obtained through forming material layers one by one in sequence from down to top and then etching the layers, slope angles 121 will be produced during these processes, and for example the slope angles 121 produced at the lateral edges of the horizontal metal layer 114 and the vertical metal layer 115. In operation, a large amount of charges can accumulate at the slope angles 121 of the horizontal metal layer 114 and the vertical metal layer 115 during signal transmitting; if static electricity occurs when an object contacts with the touch screen, the static electricity may conduct with the charges and thus undermine the vertical metal layer, thus the vertical metal layer can not transmit signals any more, and further the whole touch screen is impaired.

SUMMARY

Embodiments of the present invention provide a touch sensor and a touch screen for decreasing damage possibility of the touch screen.

One aspect of the present invention provides a touch sensor, comprising: a horizontal conducting layer, a conductive bridge having two ends respectively connected with one horizontal conducting layer, and a vertical conducting layer, the conductive bridge overlapping with the vertical conducting layer and being spaced from the vertical conductive layer by an insulating layer; the vertical conducting layer comprises at least one insulating zone provided at a first designated position; a distance of two corresponding end points in a width direction of the conductive bridge of the projection zone, which projection zone is a normal projection zone of the at least one insulating zone on the conductive bridge, is not less than a width of the conductive bridge.

Another aspect of the present invention provides a touch screen comprising the above-mentioned touch sensor.

Yet another aspect provides a display device comprising the above-mentioned touch screen.

With the touch sensor provided by an embodiment of the present invention, because the vertical conducting layer comprises at least one insulating zone, the overlapped portion of the vertical conducting layer with the conductive bridge can be divided into separate zones; when one zone is damaged, other zone(s) can still work properly, and thus the use of this touch sensor can decrease damage possibility of a touch screen.

BRIEF DESCRIPTION OF THE DRAWINGS

In order to illustrate the technical solution of the embodiment of the present invention more clearly, a simply introduction about the drawings of the embodiments will be made in the following, and obviously, the drawings described later relate to only some embodiments of the present invention, rather than limitation to the present invention.

FIG. 1 is a structural schematic top view of an existing touch sensor;

FIG. 2 is a schematic view of the sectional structure along the A'A direction of FIG. 1;

FIG. 3 is a schematic view of the sectional structure along the B'B direction of FIG. 1;

DETAILED DESCRIPTION

To make clearer the object, technical solutions and advantages of the embodiments of the present invention, a clear and full description of the technical solution of the embodiment of the present invention will be made with reference to the accompanying drawings of the embodiment of the present invention. Obviously, the described embodiments are merely part of the embodiments of the present invention, but not all the embodiments. Based on the described embodiments of the present invention, all the other embodiments conceived by the ordinary skilled in this art, without any creative work, fall into the protective scope of the present invention.

Unless otherwise defined, the technical or scientific terminologies used herein should have common meanings to be understood by the ordinary skilled in the relevant art of the present invention. Phrases such as "first", "second" as well as similar words used in the patent application specification and claims of the present invention do not mean any sequence, quantity or importance, but are only used to distinguish different components. Similarly, phrases such as "a", "an", "the" or the like do not mean quantitative restriction, but mean the existence of at least one object. Phrases such as "comprise", "include" or "contain" and similar words intend to mean that the elements or articles before the phrases encompass the elements or articles and the equivalent thereof listed after the phrases, and do not exclude other elements or articles. Phrases such as "connected to" or "coupled with" are not limited to physically or mechanically connection, but include electrically connection, no matter direct or indirect. Further, phrases such as "upper", "lower", "left", "right" etc are used only for describing a relative positional relationship, which will be varied correspondingly when the described objects are changed in absolute positions.

With the touch sensor provided by an embodiment of the present invention, because a vertical conducting layer comprises at least one insulating zone, the overlapped portion of the vertical conducting layer with a conductive bridge can be divided into separate zones; when one zone is damaged, other zone(s) can still work normally, and thus the use of this touch sensor can decrease damage possibility of a touch screen. Specific embodiments are introduced in the following.

Embodiment 1

Figure 4A:
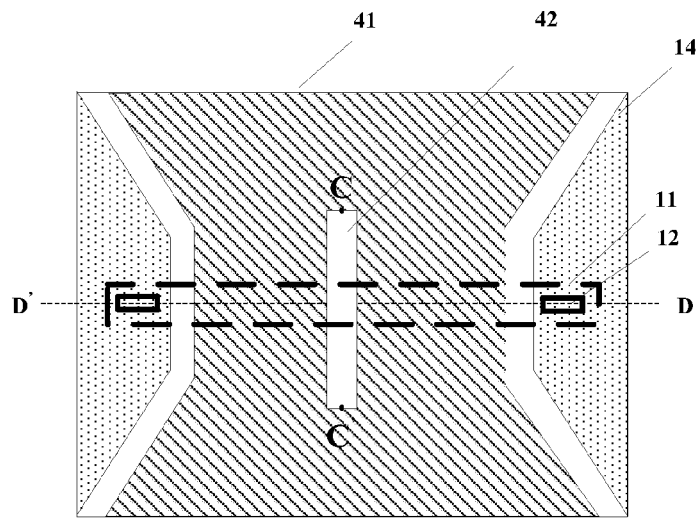
FIG. 4A is a structural schematic top view of the first touch sensor provided by the first embodiment of the present invention.
Figure 4B:
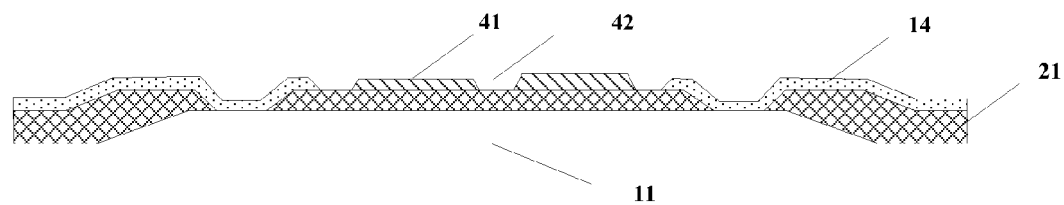
FIG. 4B is a schematic view of the sectional structure along the D'D direction of the FIG. 4A.

As shown in FIG. 4A, the first embodiment of the present invention provides a first touch sensor, and FIG. 4B is a sectional view along the D'D direction of FIG. 4A. The touch sensor comprises a conductive bridge 11 formed extending transversely on a substrate, an insulating layer 21 formed on the conductive bridge 11, a horizontal conducting layer 14 and a vertical conducting layer 41 formed to be spaced from each other on the insulating layer 21. Two horizontal conducting layers 14 on both sides of the vertical conducting layer 41 are conducted with the conductive bridge 11 extending transversely via through holes 12 in the insulating layer 21.

The substrate may be a glass or plastic substrate, such as the substrate on the display side of a liquid crystal display device (e.g., a color filter substrate), or an individual glass or plastic substrate, which can be attached to the display device. As shown in FIG. 4A, as a whole, the horizontal conducting layer 14 extends in the horizontal direction (transversal direction) on the substrate, the vertical conducting layer 41 extends in the vertical direction (longitudinal direction) on the substrate and vertically overlaps with the conductive bridge 11 but is spaced from the conductive bridge 11 with the insulating layer 21; through holes 12 are formed at the ends of each conductive bridge 11 from the above.

The above-mentioned conductive bridge 11, horizontal conducting layer 14 and vertical conducting layer 41 may be formed of, for example, a metal material or a transparent conductor material; the metal material is, for example, aluminum, aluminum alloy or the like, and the transparent conductor material is, for example, indium tin oxide (ITO), indium zinc oxide (IZO), or the like.

The touch sensor may be prepared through the following manufacturing process.

Step one, forming a layer of metal on a substrate for example and then etching the same to form a conductive bridge 11;

Step two, forming a passivation layer (e.g., a PVX layer) on the conductive bridge 11, and then etching the same to form an insulating layer 21 with through holes 12 therein; the positions of the through holes 12 are, as shown in FIG. 4A, located at the ends of the conductive bridge 11 from the above;

Step three, forming a transparent conducting layer (e.g., ITO) on the insulating layer 21, and then etching the same to form a horizontal conducting layer 14, a vertical conducting layer 41 as well as one insulating zone 42 in the vertical conducting layer 41.

The vertical conducting layer 41 comprises one insulating zone 42 provided at a first designated position. The insulating zone 42 is for example an opening zone formed by removing part of the vertical conducting layer 41. The insulating zone 42 forms a projection zone on the conductive bridge 11 by normal projection (vertical to the plain where the substrate is provided, that is, the paper plain of FIG. 4A). The projection zone is identical with the insulating zone in its shape and size, the distance between two end points of the projection zone in the width direction of the conductive bridge 11 is not less than the width of the conductive bridge, and the two corresponding end points, that is, the points C and C' in FIG. 4A, have a distance therebetween not less than the width of the conductive bridge 11.

In this embodiment, the insulating zone 42 is in a strip shape, and the first designated position refers to the position where the insulating zone 42 is perpendicular to the conductive bridge 11.

After forming of the above touch sensor, a passivation layer may be further formed thereon for the purpose of flatness, and the passivation layer may be filled into the insulating zone 42 of the vertical conducting layer 41.

Embodiment 2

Figure 4C:
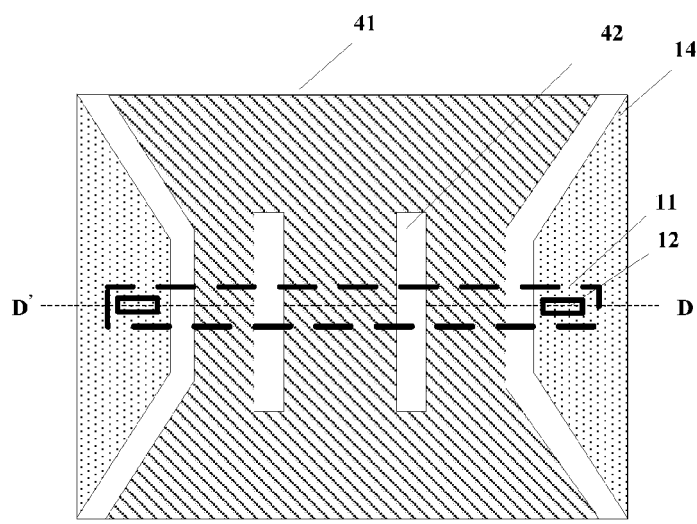
FIG. 4C is a structural schematic top view of the second touch sensor provided by the second embodiment of the present invention.

The second embodiment of the present invention provides a second touch sensor, which differs from the touch sensor of the first embodiment in that: as shown in FIG. 4C, there are two insulating zones 42 identical to each other in shape and size in the vertical conducting layer 41; and both the insulating zones 42 are parallel to each other and spaced apart by a predetermined distance, and their center points are on a same horizontal line.

Figure 5:
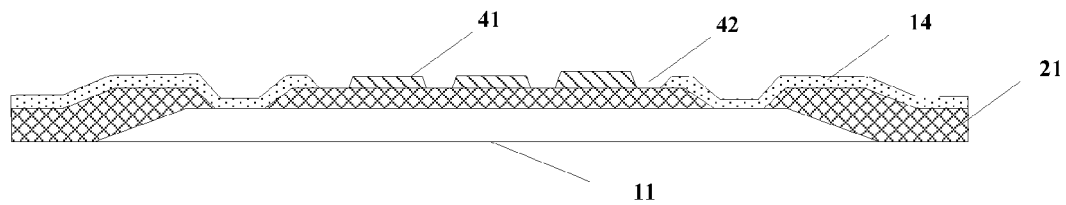
FIG. 5 is a schematic view of the sectional structure along the D'D direction of FIG. 4C.

Here the first designated position means the positions where both insulating zones 42 are perpendicular to the conductive bridge 11 respectively and at a same horizontal position; FIG. 5 is a sectional view along the D'D direction of FIG. 4C.

In another example, the vertical conducting layer 41 may comprise more than two insulating zones 42, these insulating zones 42 are parallel to each other and spaced apart by a predetermined distance, and their center points are on a same horizontal line.

Embodiment 3

Figure 6A:
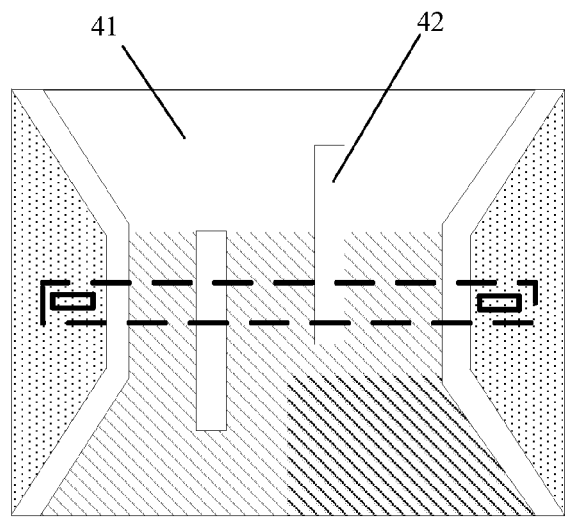
FIG. 6A is a structural schematic top view of the third touch sensor provided by the third embodiment of the present invention.

As shown in FIG. 6A, the third embodiment of the present invention provides a third touch sensor with the following difference from the touch sensor of the second embodiment.

The center points of two or more than two insulating zones 42 of the vertical conducting layer are not on a same horizontal line; and as a matter of convenience, the positions where the two insulating zones are provided, as shown in FIG. 6A, are described.

In another example, the vertical conducting layer 41 may comprise more than two insulating zones 42, these insulating zones 42 are parallel to each other and spaced apart by a predetermined distance, and their center points are not on a same horizontal line.

Embodiment 4

Figure 6B:
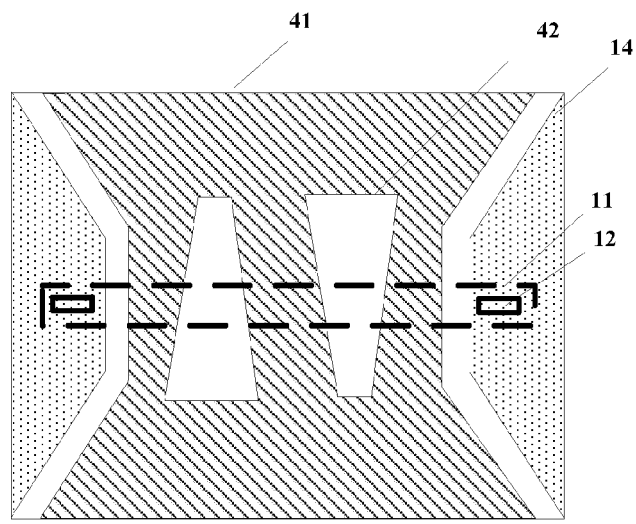
FIG. 6B is a structural schematic top view of the fourth touch sensor provided by the fourth embodiment of the present invention.

As shown in FIG. 6B, the fourth embodiment of the present invention provides a fourth touch sensor with the following difference from the touch sensor of the second embodiment.

Two or more insulating zones 42 of the vertical conducting layer 41 are not the same in their shapes and sizes, and their center points may or may not on a same horizontal line. Furthermore, the shape for the insulating zone 42 is not limited to the trapezoid shape as shown in FIG. 6B, but may also be in other irregular shapes.

Embodiment 5

Figure 7:
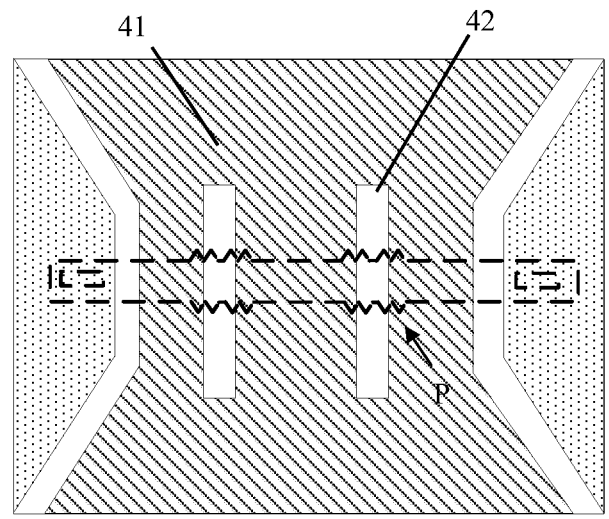
FIG. 7 is a structural schematic top view of the fifth touch sensor provided by the fifth embodiment of the present invention.

As shown in FIG. 7, the fifth embodiment of the present invention provides a fifth touch sensor with the following difference from the touch sensors of the above embodiments.

The portions P of the edges of the conductive bridge at the positions of the edges of the insulating zone 42 corresponding to the edges of the conductive bridge 11 in the vertical direction are shaped to be irregular; for example, the irregular shape may be a saw shape.

Embodiment 6

Figure 8:
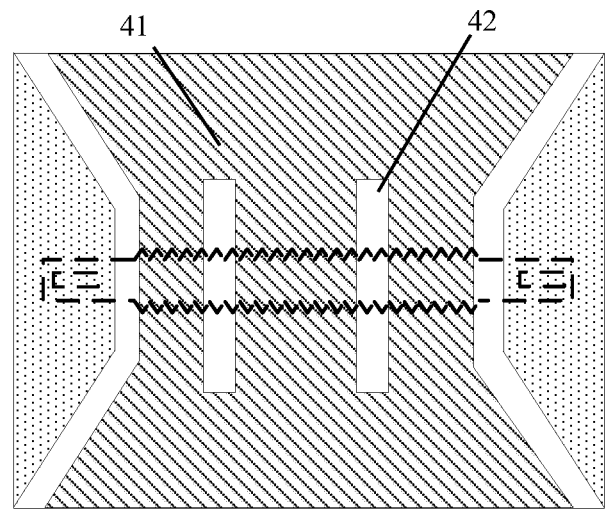
FIG. 8 is a structural schematic top view of the sixth touch sensor provided by the sixth embodiment of the present invention.

As shown in FIG. 8, the sixth embodiment of the present invention provides a sixth touch sensor with the following difference from the touch sensors of the fifth embodiment.

The edge of the conductive bridge 11 may be entirely provided in an irregular shape; and the irregular shape may be a saw shape.

The touch sensors of embodiments 2 to 6 may be produced in a method similar to that described in embodiment 1.

The structure of the vertical conducting layer in embodiment 1, 2, 3 or 4 may be combined with the conductive bridge 11 of embodiment 5 or 6 in any suitable way so as to form a touch sensor.

Preferably, when the touch sensor of embodiment 6 is used, it is possible to simplify the manufacturing technology for preparing the conductive bridge 11 compared with embodiment 5.

The materials for forming the structures and functional layers of the embodiments of the present invention are not limited to the materials described above, and other suitable materials having similar properties are also applicable, and the scope of the present invention should not be limited to specific selection of such materials.

The touch sensors proposed in the above embodiments 5 and 6 can further avoid excess accumulation of charges at slope angles. In particular, the insulating zones 42 are located between two horizontal conducting layers 14 and do not contact with the horizontal conducting layers 14.

When the vertical conducting layer 41 comprises a plurality insulating zones 42 therein, the following conditions should be satisfied.

First, the first designated position should ensure that all the insulating zones 42 are not intersected with each other;

Second, every two insulating zones 42 are spaced apart by a first preset distance; the first preset distance can be determined according to actual requirements;

Third, the insulating zones are spaced apart from the adjacent horizontal conducting layers by a second preset distance; the second preset distance can be determined according to actual requirements.

Preferably, when the vertical conducting layer 41 comprises insulating zones 42 therein, if the conducting region between two adjacent insulating zones is damaged, the conducting region(s) in another portion(s) in the vertical conducting layer can still work properly so as to transmit signals, thus ensuring that the touch sensor can work normally.

Another embodiment of the present invention provides a touch screen comprising the touch sensors of any of the above embodiments. For example, the touch screen comprises a display panel, the touch sensor can be directly formed on the front surface of the display panel, or the touch sensor can be formed as an individual layer-like component and then attached onto the front surface of the display panel.

Yet another embodiment of the present invention provides a display device comprising the above touch screen.

With the touch sensor provided by the embodiment of the present invention, because the vertical conducting layer 41 comprises at least one insulating zone 42, the overlapped portion of the vertical conducting layer 41 with the conductive bridge 11 may be divided into separate zones, when one zone is damaged, other zone(s) can still work properly, and thus the use of this touch sensor can decrease damage possibility of a touch screen.

Preferably, when the touch sensor of embodiment 6 is used, it is possible to simplify the manufacturing technology for preparing the conductive bridge 11 compared with embodiment 5.

Preferably, the touch sensors proposed in embodiments 5 and 6 of the present invention can further avoid damages caused by excessive accumulation of charges at the slope angles in the vertical conducting layer.

The above are only the exemplary embodiments of the present invention, but not limiting the protective scope of the present invention, the protective scope of the present invention is determined by the appended claims.

The invention claimed is:

1. A touch sensor, comprising: a horizontal conducting layer, a conductive bridge having two ends respectively connected with one horizontal conducting layer, and a vertical conducting layer, wherein the conductive bridge and the vertical conducting layer are provided in different layers and vertically overlapped with each other, and a layer where the conductive bridge is located is spaced with the vertical conducting layer by an insulating layer;

the vertical conducting layer comprises at least one insulating zone provided at a first designated position, the insulating zone is an opening region formed in the vertical conducting layer, and along an extension direction of the conductive bridge, an orthographic projection, on a plane where the conductive bridge is located, of the opening region is arranged between the two ends of the conductive bridge; and a distance of two corresponding end points in a width direction of the conductive bridge of a projection zone, which projection zone is a normal projection zone of the at least one insulating zone on the conductive bridge, is not less than a width of the conductive bridge.

2. The touch sensor according to claim 1, wherein the vertical conducting layer comprises at least two insulating zones provided at the first designated position, and every two insulating zones are spaced by a first preset distance therebetween.

3. The touch sensor according to claim 1, wherein the insulating zone and the horizontal conducting layer adjacent thereto are spaced by a second preset distance.

4. The touch sensor according to claim 2, wherein shapes of all insulating zones are the same to each other or not.

5. The touch sensor according to claim 1, wherein the insulating zone is in a rectangle shape.

6. The touch sensor according to claim 5, wherein a long side of the insulating zone is perpendicular to the conductive bridge.

7. The touch sensor according to claim 1, wherein edges of the conductive bridge are of an irregular shape.

8. The touch sensor according to claim 7, wherein part of edges of the conductive bridge corresponding to the at least one insulating zone of the vertical conducting layer is of an irregular shape.

9. The touch sensor according to claim 7, wherein the irregular shape is a saw shape.

10. A touch screen comprising the touch sensor according to claim 1.

11. A display device comprising the touch screen according to claim 10.

12. The touch sensor according to claim 2, wherein the insulating zone and the horizontal conducting layer adjacent thereto are spaced by a second preset distance.

13. The touch sensor according to claim 2, wherein the insulating zone is in a rectangle shape.

14. The touch sensor according to claim 13, wherein a long side of the insulating zone is perpendicular to the conductive bridge.

15. The touch sensor according to claim 2, wherein edges of the conductive bridge are of an irregular shape.

16. The touch sensor according to claim 15, wherein part of edges of the conductive bridge corresponding to the at least one insulating zone of the vertical conducting layer is of an irregular shape.

17. The touch sensor according to claim 16, wherein the irregular shape is a saw shape.

* * * * *